(12) United States Patent
Matsuoka

(10) Patent No.: US 9,107,075 B1
(45) Date of Patent: Aug. 11, 2015

(54) PROXIMITY UNLOCK AND LOCKOUT

(71) Applicant: Google Inc., Mountain View, CA (US)

(72) Inventor: Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 14 days.

(21) Appl. No.: 13/763,558

(22) Filed: Feb. 8, 2013

Related U.S. Application Data

(63) Continuation of application No. 13/464,889, filed on May 4, 2012, now Pat. No. 8,396,452.

(51) Int. Cl.
*H04M 1/66* (2006.01)
*H04W 12/08* (2009.01)

(52) U.S. Cl.
CPC .................................... *H04W 12/08* (2013.01)

(58) Field of Classification Search
CPC ......... H04M 5/00; H04W 4/02; H04W 12/06; H04W 12/02
USPC .................. 455/411, 456.1; 340/5.1–5.2, 340/5.6–5.691, 5.7, 5.74, 5.8–5.81, 4.3; 726/173
See application file for complete search history.

(56) References Cited

U.S. PATENT DOCUMENTS

| | | | |
|---|---|---|---|
| 2003/0074590 A1* | 4/2003 | Fogle et al. | 713/320 |
| 2005/0193144 A1* | 9/2005 | Hassan et al. | 709/238 |
| 2005/0221798 A1 | 10/2005 | Sengupta et al. | |
| 2007/0075965 A1* | 4/2007 | Huppi et al. | 345/156 |
| 2009/0210940 A1 | 8/2009 | Dean | |
| 2011/0154486 A1 | 6/2011 | Fusari | |
| 2011/0215921 A1 | 9/2011 | Ben Ayed et al. | |
| 2011/0246757 A1 | 10/2011 | Prakash et al. | |
| 2011/0287739 A1 | 11/2011 | Cajigas Bringas et al. | |
| 2011/0302627 A1 | 12/2011 | Blom et al. | |
| 2011/0313922 A1 | 12/2011 | Ben Ayed | |
| 2012/0146918 A1 | 6/2012 | Kreiner et al. | |
| 2013/0298226 A1* | 11/2013 | Fang et al. | 726/20 |

\* cited by examiner

*Primary Examiner* — Nathan Taylor
(74) *Attorney, Agent, or Firm* — McDermott Will & Emery LLP

(57) ABSTRACT

A computer-implemented method for providing secure access to a mobile device is disclosed according to one aspect of the subject technology. The method comprises detecting a presence of a computer at the mobile device, disabling a lockout mode of the mobile device upon detecting the presence of the computer, detecting when the mobile device has moved away from the computer, and enabling the lockout mode of the mobile device upon detecting that the mobile device has moved away from the computer.

20 Claims, 4 Drawing Sheets

PROXIMITY UNLOCK AND LOCKOUT

RELATED APPLICATION

This application is a continuation of U.S. patent application Ser. No. 13/464,889, filed on May 4, 2012, entitled "PROXIMITY LOGIN AND LOGOFF," the contents of which are herein incorporated by reference in its entirety.

FIELD

The subject disclosure generally relates to computers, and, in particular, to proximity login into and logoff from a computer.

BACKGROUND

A mobile device may include a lockout mode, in which the mobile device automatically locks out when no user activity (e.g., a key press, a touch on a touch screen, etc.) is detected on the device for a period of time. When the mobile device locks out, the user is unable to access many of the features of the mobile device. To unlock the mobile device, the user may have to manually enter a password, trace a certain pattern on a touch screen, etc.

SUMMARY

A computer-implemented method for providing secure access to a mobile device is disclosed according to one aspect of the subject technology. The method comprises detecting a presence of a computer at the mobile device, disabling a lockout mode of the mobile device upon detecting the presence of the computer, detecting when the mobile device has moved away from the computer, and enabling the lockout mode of the mobile device upon detecting that the mobile device has moved away from the computer.

A machine-readable medium comprising instructions stored therein is disclosed according to one aspect of the subject technology. The instructions, which when executed by a machine, cause the machine to perform operations for providing secure access to a mobile device. The operations comprise receiving a message from a computer indicating that a user has been successfully logged into the computer, disabling a lockout mode of the mobile device upon receiving the message, detecting when the mobile device has moved away from the computer, and enabling the lockout mode of the mobile device upon detecting that the mobile device has moved away from the computer.

A system for providing secure access to a mobile device is disclosed according to one aspect of the subject technology. The system comprises one or more processors, and a machine-readable medium comprising instructions stored therein, which when executed by the one or more processors, cause the one or more processors to perform operations. The operations comprise receiving a wireless signal from a computer at the mobile device, wherein the wireless signal indicates the presence of the computer, disabling a lockout mode of the mobile device upon receiving the wireless signal from the computer, detecting when the mobile device has moved away from the computer, and enabling the lockout mode of the mobile device upon detecting that the mobile device has moved away from the computer.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
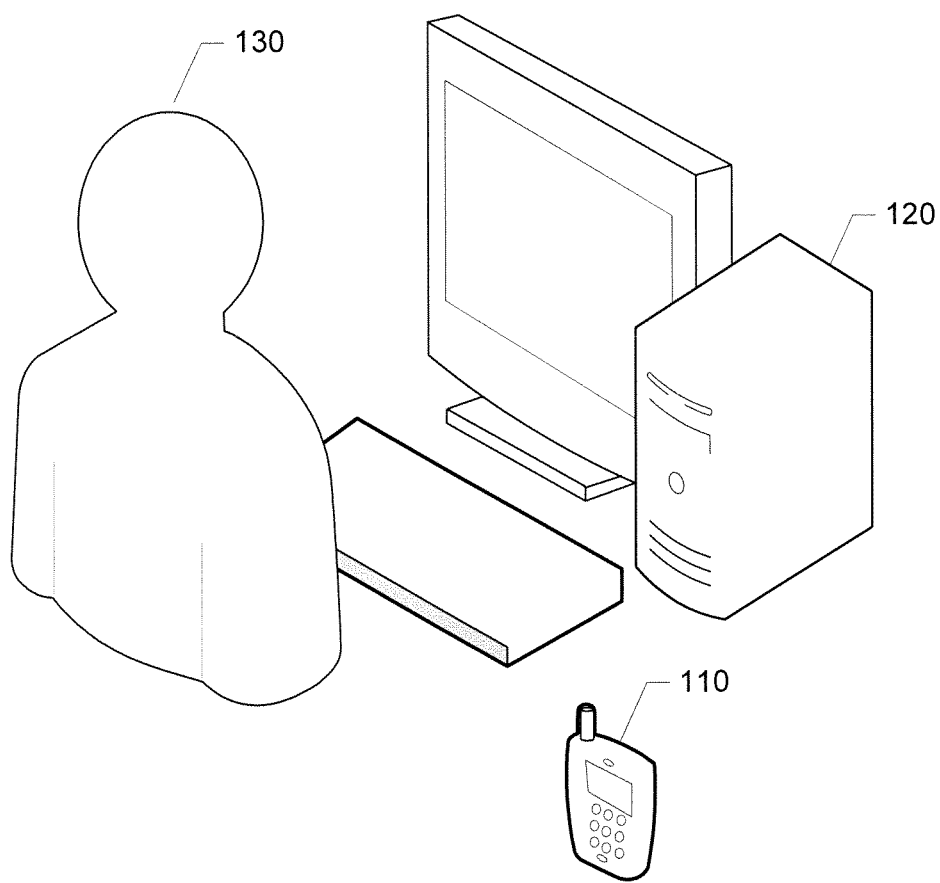
FIG. 1 shows an example of a computer and a mobile device according to an aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

For security purposes, a computer (e.g., laptop) may require a user to log into the computer in order to use the computer. The user may log into the computer by typing user credentials (e.g., user name and password) into the computer. When the user leaves the computer, the user may want to prevent another user from using the computer (e.g., to protect personal information stored on the computer). To prevent unauthorized access to the computer, the user may log off of the computer before leaving the computer. However, the user may find it inconvenient to have to manually log into a computer each time the user wants to use the computer and to manually log off the computer each the user leaves the computer.

A computer may have an automatic logoff feature, in which the computer automatically times out when no user activity is detected for a period of time (e.g., ten minutes) and logs off the user. While this feature relieves the user from having to manually log off of the computer, the computer is vulnerable to unauthorized access before the computer times out.

Various aspects of the subject technology address these problems by using a mobile electronic device (e.g., smart phone) to automatically log a user into and off of a computer. In one aspect, the mobile device comprises a wireless communication interface configured to wirelessly communicate with the computer via a short-range wireless link (e.g., Bluetooth link, Wi-Fi link, near field communication (NFC) link, etc.). When the mobile device is brought near the computer, the mobile device may automatically log the user into the computer (e.g., by transmitting user credentials stored on the mobile device to the computer and/or by successfully pairing with the computer via a secure Bluetooth link). Thus, the user may automatically log into the computer by simply carrying the mobile device in his/her pocket and sitting in front of the computer so that the mobile device is in close proximity to the computer.

The mobile device may also be used to automatically log the user off of the computer when the mobile device is moved away from the computer. For example, the computer may be programmed to automatically log off the user when the computer losses communication with the mobile device because the mobile device is moved out of range of the computer by the user. Thus, the user may automatically log off of the computer by simply walking away from the computer with the mobile device.

FIG. 1 shows an example of a mobile device 110 in close proximity to a computer 120. As discussed above, the mobile device 110 may automatically log into the computer 120 on behalf of the user 130 when the mobile device 110 is brought into close proximity to the computer 120 (e.g., by sending user credentials to the computer 120 via a wireless link). The computer 120 may automatically log off the user 130 when the mobile device 110 is moved away from the computer 120. The mobile device 110 may be a smart phone, a personal digital assistant (PDA), a tablet, a laptop computer, etc. The mobile device 110 may also be a standalone device used primarily for logging the user into and off of the computer 120. The computer 120 may be a desktop computer, a tablet, a laptop computer, etc.

In one aspect, the computer 120 may determine when the mobile device 110 is in close proximity to the computer 120 by measuring the strength of a wireless signal received from the mobile device 110 and determining that the mobile device 110 is in close proximity when the measured signal strength is equal to or above a threshold. In this aspect, the computer 120 may allow the mobile device 110 to log the user into the computer 120 when the computer detects that the mobile device 110 is in close proximity based on the measured signal strength. The mobile device 110 may log the user into the computer 120 by sending proper user credentials (e.g., username and password) to the computer 120 via the wireless signal.

In this aspect, after the user is logged into the computer 120, the mobile device 110 may periodically transmit a wireless signal to the computer 120 to verify that the mobile device 110 is still near the computer 120. Each time the mobile device 110 transmits a wireless signal, the computer 120 may measure the received signal strength and determine whether the measured signal strength is equal to or above the threshold. If the measured signal strength is equal to or above the threshold, then the computer 120 may determine that the mobile device 110 is still in close proximity to the computer 120 and keep the user logged into the computer 120. If the measured signal strength drops below the threshold, then the computer 120 may determine that the mobile device 110 is no longer in close proximity to the computer 120 and automatically log the user off of the computer 120. This may occur when the user moves the mobile device 110 away from the computer 120. The computer 120 may also determine that the mobile device 110 is no longer in close proximity when the computer 120 losses communication with the mobile device 110 (e.g., fails to receive a signal from the mobile device 110 at a predetermined time or within a certain period of time).

To conserve power, the mobile device 110 may periodically turn on its transmitter to transmit a wireless signal to the computer 120 instead of leaving its transmitter turned on continuously. The time interval between transmissions may be set to a default value (e.g., two seconds) or set by the user via a settings menu on the mobile device 110. In addition, the computer 120 may periodically turn on its receiver to receive a wireless signal from the computer 120 instead of leaving its receiver turned on continuously. In this aspect, the mobile device 110 and the computer 120 may be synchronized in time so that the computer 120 turns on its receiver at approximately the same time that the mobile device 110 turns on its transmitter to transmit a wireless signal. Various methods for synching the mobile device 110 and the computer 120 are discussed further below.

In one aspect, the mobile device 110 and the computer 120 may both support Bluetooth communication. As is known in the art, two Bluetooth-enabled devices may be placed in a discoverable mode, which allows the Bluetooth-enabled devices to discover each other when they are brought within range of each other. As a security feature, a Bluetooth-enabled device may require a personal identification number (PIN) from another Bluetooth-enabled device before pairing with the other Bluetooth-enabled device. The PIN may be pre-programmed or user selected. Once two Bluetooth devices pair with each other, they may exchange data with each other via a secure Bluetooth link.

In this aspect, the mobile device 110 and/or the computer 120 may be placed in the discoverable mode so that the mobile device 110 and the computer 120 can discover each other when the mobile device 110 is brought into close proximity to the computer 120 (within range of each other). In addition, the computer 120 may require a PIN from the mobile device 110 before allowing the mobile device 110 to pair with the computer 120. Alternatively or in addition, the mobile device 110 may require the PIN from the computer 120 before allowing the computer 120 to pair with the mobile device 110. The PIN may be user selected or pre-programmed.

In this aspect, the computer 120 may automatically log the user into the computer 120 when the computer 120 discovers and successfully pairs with the mobile device 110. This is because the computer 120 may treat the PIN used to pair the computer 120 and the mobile device 110 as credentials for logging the user into the computer 120. The computer 120 may also automatically log off the user when the computer 120 losses its pairing with the mobile device 110. This may occur when the user moves the mobile device 110 out of range of the computer 120.

In one aspect, the computer 120 may store a device identifier of the mobile device 110 in memory. The device identifier may include a media access control (MAC) address, an international mobile subscriber identity (IMSI), a user-selected identifier or other identifier that uniquely identifies the mobile device 110. In this aspect, when the mobile device 110 initially communicates with the computer 120, the mobile device 110 may send its device identifier to the computer 120. The computer 120 may then compare the received device identifier with the device identifier stored in memory. If the two match, then the computer 120 may automatically log the user into the computer 120. This is because the computer 120 may use the device identifier to identify the mobile device 110 as belonging to the user. If the two do not match, then the computer 120 may deny the user access to the computer 120. In this case, the user may manually log into the computer 120 by typing credentials into the computer 120 or other means.

In one aspect, the mobile device 110 may include a lockout mode, in which the mobile device automatically locks out when no user activity (e.g., a key press, a touch on a touch screen, etc.) is detected on the device for a period of time. The period of time may be based on a default setting or may be set by the user via a settings menu on the mobile device 110. When the mobile device 110 locks out, the user may have to manually unlock the mobile device 110 by entering a password, tracing a certain pattern on a touch screen, etc.

In this aspect, the mobile device 110 may disable the lockout mode of the mobile device while the mobile device 110 is in close proximity to the computer 120. This is because the mobile device 110 may treat the close proximity to the computer 120 as an indication that the user is also in close proximity to the mobile device 110. Thus, while the mobile device 110 is in close proximity to the computer 120, the user may access the mobile device 110 without having to unlock the mobile device 110.

In this aspect, when the mobile device 110 logs the user into the computer 120 (e.g., by transmitting user credentials to the computer and/or successfully pairing with the computer), the computer 120 may send a message to the mobile device 110 indicating that the user is logged into the computer 120. In response to the message, the mobile device 110 disables the lockout mode while the mobile device 110 remains in close proximity to the computer 120. The mobile device 110 may determine that it is in close proximity to the computer 120 when it is able to stay in wireless communication with the computer 120 (e.g., periodically receive a signal from the computer) over a short-range radio link (e.g., Bluetooth link, NFC link, etc.). When the mobile device 110 determines that it is no longer in close proximity to the computer 120 (e.g., losses communication with the computer 120), the mobile device 110 may re-enable the lockout mode. When the lockout mode is re-enabled, the mobile device 110 may lock out when it does not detect user activity for a certain period of time (e.g., a few minutes).

The mobile device 110 may also determine that it is in close proximity by periodically receiving a wireless signal from the computer 120, measuring the strength of the received wireless signal, and comparing the measure signal strength to a threshold. If the signal strength is equal to or above the threshold, then the mobile device 110 determines that it is in close proximity to the computer 120 and leaves the lockout mode disabled. If the signal strength drops below the threshold, then the mobile device 110 may re-enable the lockout mode.

To conserve battery power, the mobile device 110 may periodically turn on its receiver to receive a wireless signal from the computer 120 instead of leaving its receiver turned on continuously. Similarly, the computer 120 may periodically turn on its transmitter to transmit a wireless signal instead of leaving its transmitter turned on continuously. In this aspect, the mobile device 110 and the computer 120 may be synchronized in time so that the computer 120 turns on its transmitter at approximately the same time that the mobile device 110 turns on its receiver to receive a wireless signal from the computer 120.

In one aspect, after the user is logged into the computer 120, the mobile device 110 and the computer 120 may periodically exchange wireless signals with each other to determine whether they are still in close proximity to each other. During each exchange, the mobile device 110 may determine that it is still in close proximity to the computer 120 when the signal strength of the wireless signal received from the computer 120 is equal to or above a first threshold. Similarly, the computer 120 may determine that its is still in close proximity to the mobile device 110 when the signal strength of the wireless signal received from the mobile device 110 is equal to or above a second threshold. The first and second thresholds may be the same or different.

The mobile device 110 and the computer 120 may be synchronized in time so that the mobile device 110 and the computer 120 turn on their respective transceivers at approximately the same time to exchange wireless signals with each other and determine whether they are still in close proximity to each other. To achieve time synchronization, the mobile device 110 may have a clock that is synchronized with a clock on the computer 120. The mobile device 110 and the computer 120 may each be programmed to periodically turn on the respective transceiver at approximately the same time intervals (e.g., every 2 seconds) based on the respective clock.

The two clocks may be synchronized with each other by sending a time synchronization signal from the computer 120 to the mobile device 110 or vise versa when the mobile device 110 and the computer 120 initially communicate with each other. Alternatively, both clocks may be synchronized to a common system time (e.g., GPS time, cellular network time, etc.). The mobile device 110 and computer 120 may each synchronize its clock with the common system time by receiving a timing signal from a source of the system time. For the example of GPS time, the mobile device 110 and the computer 120 may each receive the timing signal from one or more GPS satellites. For the example of cellular network time, the mobile device 110 and the computer 120 may each receive the timing signal from one or more cellular base stations.

In one aspect, the computer 120 may be a multiuser computer that maintains different user accounts for different users of the computer 120. For each user account, the computer 120 may store personal information (e.g., bookmarks, browser history, login information, etc.) for the corresponding user in the memory. The personal information for each user is linked to the corresponding account and may only be accessed by logging into the user account. This prevents other users from accessing the personal information. While a user is logged into his/her user account, any new personal information (e.g., new bookmark entry) that is created by the user and/or computer may be linked to the user account.

The personal information for a user may include the user's browser history such as addresses (e.g., URLs) of websites visited by the user, a list of URLs typed into the address bar by the user and/or a list of search terms typed into the computer by the user. The personal information may also include personal documents (e.g., a document authored by the user), files, and applications. The personal information may also include user settings such as theme information specifying the look of the desktop, toolbar settings, screen saver settings, security settings, preferred web browser, preferred homepage, etc. The personal information may also include login information (e.g., username and password) for one or more online accounts that are accessible from the computer over a network (e.g., the Internet). The personal information may also include address, phone number, billing information and/or other sensitive information about the user.

In this aspect, the computer 120 may store different user credentials for each user account in memory. The mobile device 110 of a particular user may log the user into his/her account on the computer 120 when the mobile device 110 is brought into close proximity of the computer 120. For example, when the mobile device 110 is brought into close proximity, the mobile device 110 may transmit the user credentials for the corresponding user to the computer 120. The computer 120 may then compare the received user credentials to each of the user credentials stored on the computer 120. If the received user credentials match one of the stored user credentials, then the computer 120 may automatically log into the corresponding user account. This allows a user to log into his/her account by simply bringing his/her mobile device near the computer 120 without the need of manually typing credentials into the computer 120. The computer 120 may stay logged into the user while the mobile device remains in close proximity to the computer 120, as discussed above.

When the computer 120 determines that the mobile device 110 is no longer in close proximity to the mobile device 110, the computer 120 may automatically log out of the user account. For example, the computer 120 may determine that the mobile device 110 is no longer is in close proximity to the computer 120 when the signal strength from the mobile device 110 drops below a threshold or the computer 120 losses communication with the mobile device 110, as discussed above. Thus, the computer 120 may automatically log out of the user account when the user leaves the computer 120 with the mobile device 110.

In one aspect, the computer 120 may automatically detect when the mobile device 110 is brought into close proximity of the computer 120 by listening for a signal from the mobile device 110. The signal may include a device identifier identifying the mobile device. If the computer 120 detects a signal from the mobile device 110, then the computer 120 may determine that the mobile device 110 is in close proximity to the computer 120. The computer 120 may also require that the signal strength of the detected signal be equal to or above a threshold before determining that the mobile device is in close proximity. When the computer 120 determines that the computer is in close proximity, the computer 120 may respond to the signal from the mobile device by sending an acknowledgement to the mobile device 110. Upon receiving the acknowledgement, the mobile device 110 may send user credentials to the computer 120 to log the user into the computer 120, as discussed above. In this aspect, after transmitting a signal seeking the computer 120, the mobile device 110 may turn on its receiver for a short period of time to listen for an acknowledgement, if any, from the computer 120 in response to the signal.

To conserve power, the computer 120 may periodically turn on its receiver to listen for a signal from the mobile station 110 instead of leaving its receiver turned on continuously. In this aspect, the mobile device 110 may be synchronized in time with the computer 120 and programmed to periodically turn on its transmitter to transmit a signal at the same time that the computer 120 turns on its transmitter to listen for a signal from the mobile device 110. The user may select the time interval (e.g., two seconds) between signal transmissions by entering a desired time interval into the mobile device 110 and the computer 120.

Alternatively, the computer 120 may periodically turn on its transmitter to transmit a signal, and the mobile device 110 may periodically turn on its receiver to listen for a signal from the computer 120 at the same time. When the mobile device 110 detects a signal from the computer 120, the mobile device 110 may determine that the mobile device is in close proximity to the computer 120. The mobile device 110 may also require that the signal strength of the detected signal be equal to or above a threshold before determining that the mobile device 110 is in close proximity to the computer 120. When the mobile device 110 determines that it is in close proximity to the computer 120, the mobile device 110 may transmit user credentials to the computer 120 to log the user into the computer 120. In this aspect, after the computer 120 transmits a signal seeking the mobile device 110, the computer 120 may turn on its receiver for a short period of time to listen for user credentials, if any, from the mobile device 110 in response to the signal.

In one aspect, the user credentials sent by the mobile device 110 to log the user into the computer 120 may comprise a one-time password (OTP). The OTP may be generated by inputting a time and a seed value into a OTP generator. Since the OTP is a function of time, the OTP may change each time the mobile device 110 logs the user into the computer 120, thereby preventing replay attacks.

In this aspect, the computer 120 and mobile device 110 may each include a OTP generator that uses the same algorithm and seed value to generate a OTP. The user may separately enter the same seed value into both the computer 120 and the mobile device 110. In addition, the computer 120 and the mobile device 110 may each include a clock that inputs time to the respective OTP generator. The clocks in the computer 120 and the mobile device 110 may be synchronized with each other so that the OTP generators in the computer 120 and the mobile device 110 are able to independently generate the same OTP.

In this aspect, the mobile device 110 may log the user into the computer 120 by having its OTP generate a OTP and sending the generated OTP to the computer 120. The computer 120 may have its OTP generate a OTP at approximately the same time and compare its OTP with the OTP received from the mobile device 110. If the two match, then the computer 120 may log the user into the computer 120. If the two do not match, then the computer 120 may deny the user access to the computer 120.

In one aspect, the mobile device 110 may include a proximity sensor configured to detect whether a user is in close proximity to the device (e.g., several centimeters from the device). For example, the proximity sensor may be located on the front and/or side of the mobile device 110 to determine whether the user's face or hand is in close proximity to the device. The proximity sensor may work by emitting a signal (e.g., infrared signal, ultrasound signal, etc.) and detecting whether a portion of the emitted is reflected back to the sensor from the user.

As discussed above, the mobile device 110 may disable lockout mode when the mobile device 110 determines that it is still in close proximity to the computer 120. In one aspect, the mobile device 110 may also require that the proximity sensor detect that the user is in close proximity to the device to keep the lockout mode disabled. If the proximity sensor does not detect the user nearby for a period of time, then the mobile device may re-enable the lockout mode even if the computer is nearby. This may occur, for example, when the user leaves both the mobile device 110 and the computer 120 unintended. In this aspect, the proximity sensor may detect that the user is nearby when the mobile device 120 is in the user's pocket, and may not detect that the user is nearby when the mobile device 120 is left face up on a desk with the user out of range of the proximity sensor.

Figure 2:
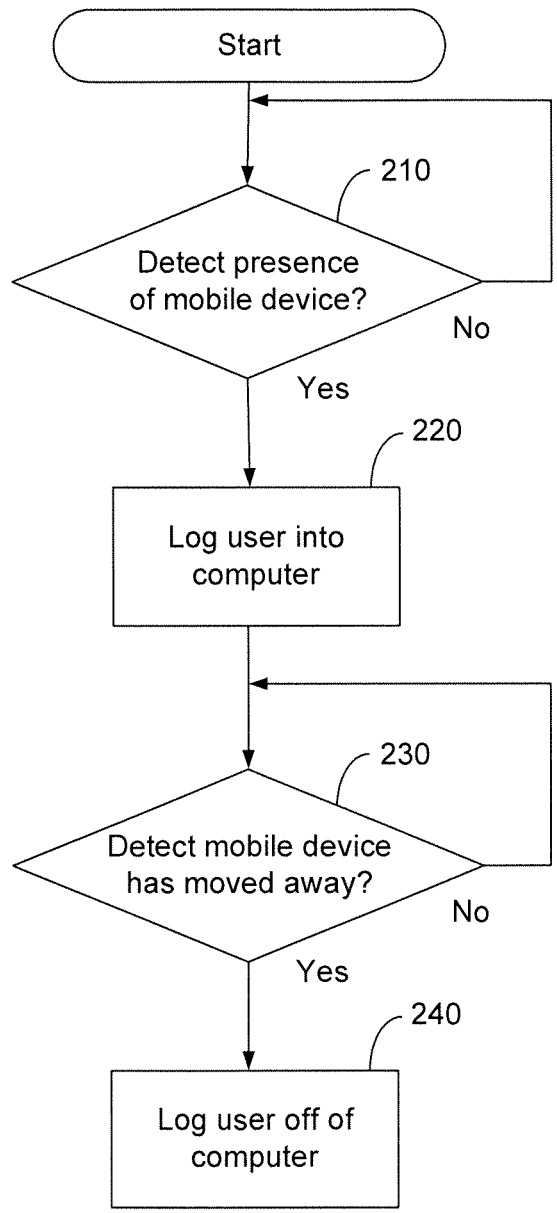
FIG. 2 shows a method for providing secure access to a computer according to an aspect of the subject technology.

FIG. 2 shows a method 200 for providing secure access at the computer 120 according to an aspect of the subject technology.

In step 210 a determination is made whether the computer 120 has detected the presence of the mobile device 110. The computer 120 may detect the presence of the mobile device 110 when the computer 120 receives a signal from the mobile device via a short-range wireless link (e.g., Bluetooth link, NFC link, etc.). The computer 120 may also require that the received signal have a signal strength equal to or above a threshold. If the presence of the mobile device 110 is not detected, then the method 200 may repeat step 210 after a short period of time (e.g., after two seconds). For example, the computer 120 may periodically turn on a receiver to listen for a signal from the mobile device. If the presence of the mobile device is detected, then the method 200 proceeds to step 220.

In step 220, the user is logged into the computer 120. In one aspect, the computer 120 may also require that the mobile device 110 send proper user credentials before logging in the user. Logging the user into the computer 120 may involve logging the computer 120 into a user account providing access to the user's personal information on the computer 120. The personal information may include browser history, user settings, sensitive information about the user (e.g., billing information, login information for online accounts, etc.), private documents, etc. Login may be required to access resources of the computer 120 (e.g., applications).

In step 230, a determination is made whether the computer 120 has detected that the mobile device 110 has moved away from the computer 120. For example, the computer 120 may detect that the mobile device 110 has moved away when the computer 120 losses communication with the mobile device over the short-range wireless link (e.g., Bluetooth link, NFC link, etc.) or a signal received from the mobile device is below a threshold. If the mobile device 110 has moved away, then the method 200 proceeds to step 240. Otherwise, the method 200 may repeat step 230 after a short period of time (e.g., two seconds).

In step 240, the user is logged off of the computer 120. This may involve logging the computer 120 out of the user account, thereby preventing others from accessing the user's personal information on the computer 120.

Figure 3:
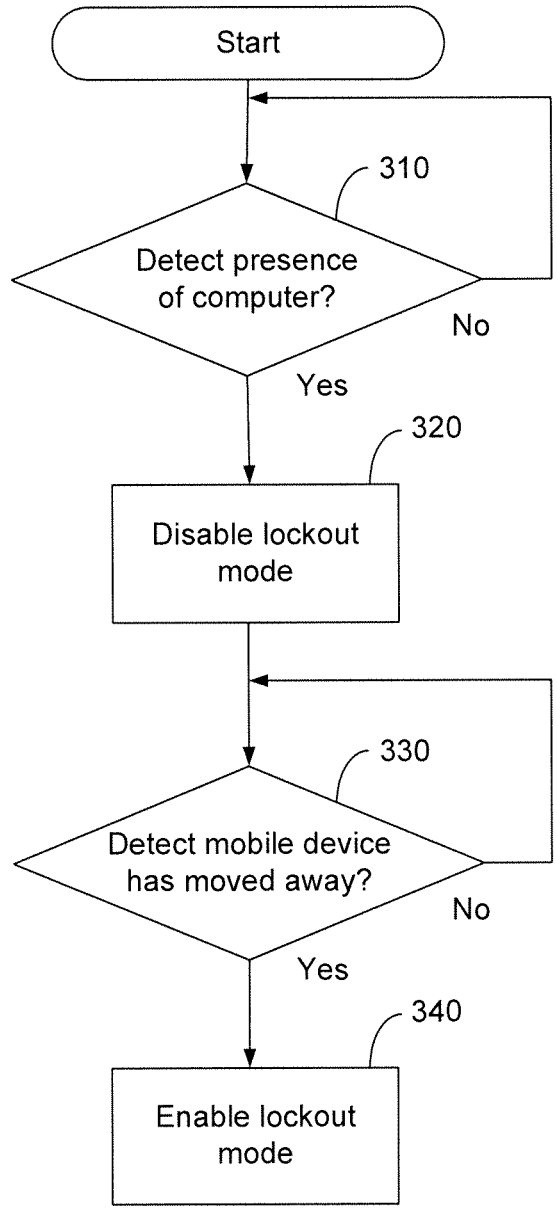
FIG. 3 shows a method for providing secure access to a mobile device according to an aspect of the subject technology.

FIG. 3 shows a method 300 for providing secure access to the mobile device 110 according to an aspect of the subject technology.

In step 310, a determination is made whether the mobile device 110 has detected the presence of the computer 120. The mobile device 110 may detect the presence of the computer 120 when the mobile device 110 receives a signal from the computer via a short-range wireless link (e.g., Bluetooth link, NFC link, etc.). The mobile device 110 may also require that the received signal have a signal strength equal to or above a threshold. If the presence of the computer 120 is not detected, then the method 300 may repeat step 310 after a short period of time (e.g., after two seconds). If the presence of the computer is detected, then the method 300 proceeds to step 320.

In step 320, the lockout mode of the mobile device 110 is disabled. The mobile device 110 may also send user credentials to the computer 120 and require that it receive a message from the computer 120 indicating that the user has been successfully logged in before disabling the lockout mode.

In step 330, a determination is made whether the mobile device 110 has detected that the mobile device 110 has moved away from the computer 120. For example, the mobile device 110 may detect that it has moved away when it losses communication with the computer over the short-range wireless link (e.g., Bluetooth link, NFC link, etc.) or a signal received from the computer is below a threshold. If the mobile device 110 has moved away, then the method 300 proceeds to step 340. Otherwise, the method 300 may repeat step 330 after a short period of time (e.g., two seconds).

In step 340, the lockout mode is enabled. As discussed above, when the lockout mode is enabled, the mobile device 110 may lock out when it does not detect user activity for a period of time. When the mobile device 110 locks out, the user may have to enter a password to unlock the device.

Figure 4:
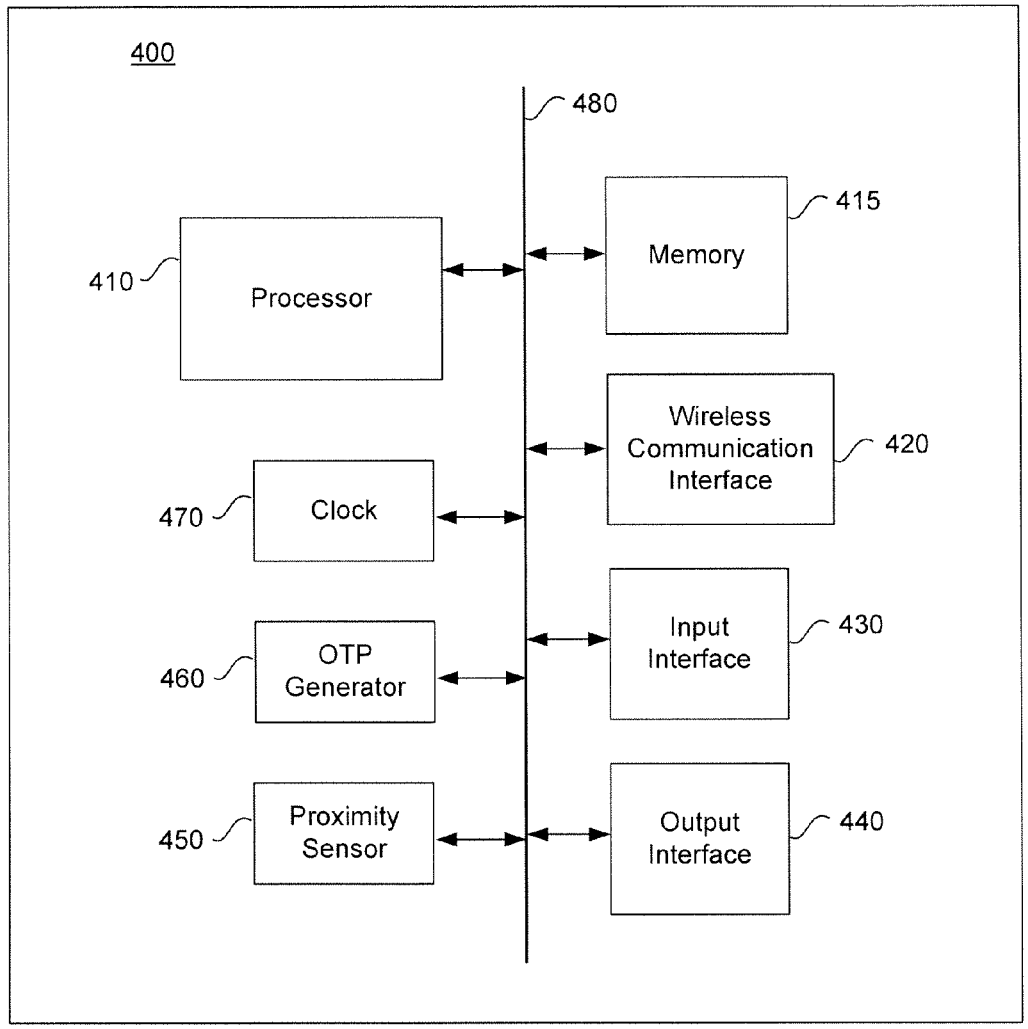
FIG. 4 conceptually illustrates a computing system with which some implementations of the subject technology may be implemented.

FIG. 4 shows a computing system 400 according to an aspect of the subject technology. The computing system 400 may be used to implement the mobile device 110 and/or the computer 120. While the computing system 400 is shown in one configuration in FIG. 4, it is to be understood that the computing system 400 may include additional, alternative and/or fewer components.

In the example shown in FIG. 4, the computing system 400 includes a processor 410, a memory 415, a wireless communication interface 420, an input interface 430, an output interface 440, a proximity sensor 450, a OTP generator 460, a clock 470, and a bus 480. The bus 480 collectively represents all system, peripheral, and chipset buses that communicatively connect the numerous components of the computing system 400. For instance, the bus 480 communicatively connects the processor 410 with the memory 415. The processor 410 may retrieve instructions from the memory 415 and execute the instructions to implement processes according to various aspects of the subject technology. The processor 410 may comprise a single processor or a multi-core processor in different implementations.

The memory 415 may comprise one or more memory units including non-volatile memory and volatile memory. For example, the memory 415 may include non-volatile memory for storing firmware, an operating system (OS), applications, and/or files. The memory 415 may also include volatile memory (e.g., a random access memory) for storing instructions and data that the processor 410 needs at runtime.

The input interface 430 enables a user to communicate information and commands to the computing system 400. For example, the input interface 430 may be coupled to a keyboard, keypad, and/or a pointing device (e.g., mouse or touch pad) to receive commands from the user. In another example, the input interface 430 may be coupled to a touch screen that receives commands from the user by detecting the presence and location of a user's finger/hand or stylus on the touch screen. The received commands may be sent to the processor 410 for processing.

The output interface 440 may be used to communicate information to the user. For example, the output interface 440 may output information from the processor 410 to the user on a display (e.g., liquid crystal display (LCD)).

The wireless communication interface 420 enables the computing system 400 to communicate with another system via a wireless link (e.g., Bluetooth link, NFC link, etc.). The wireless communication interface 420 may include a transceiver for both receiving wireless signals and transmitting wireless signals.

The proximity sensor 450 may be configured to detect the physical presence of a user. For example, the proximity 450 sensor may detect a user by emitting a signal and detecting a portion of the signal reflected back to the proximity sensor from the user.

The OTP generator 460 may be configured to generate OTP. As discussed above, the OTP may be used to login a user while preventing replay attacks. The clock 470 may be configured to provide timing for the computing system 400. For example, the clock 470 may be used to provide timing for periodically turning on a receiver to listen for a signal from another system and/or periodically turning on a transmitter to transmit a signal to another system. The receiver and transmitter may be part of the wireless communication interface 420.

Many of the above-described features and applications may be implemented as a set of machine-readable instructions stored on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing secure access to a mobile device, the method comprising:
   detecting a presence of a computer at the mobile device;
   disabling a lockout mode of the mobile device upon detecting the presence of the computer, wherein the lockout mode locks the mobile device when no user activity is detected on the mobile device for a period of time,
   wherein the lockout mode is re-enabled at the mobile device when a user of the mobile device is determined to be away from the mobile device even when the mobile device is in the presence of the computer that causes the disabling of the lockout mode;
   detecting when the mobile device has moved away from the computer; and
   enabling the lockout mode of the mobile device upon detecting that the mobile device has moved away from the computer.

2. The computer-implemented method of claim 1, wherein detecting when the mobile device has moved away from the computer comprises detecting when the mobile device losses communication with the computer over a wireless link.

3. The computer-implemented method of claim 2, wherein the wireless link comprises a Bluetooth link or a near field communication (NFC) link.

4. The computer-implemented method of claim 1, wherein detecting the presence of the computer comprises receiving a wireless signal from the computer at the mobile device.

5. The computer-implemented method of claim 1, wherein detecting when the mobile device has moved away from the computer comprises:
   receiving, at the mobile device, a wireless signal from the computer;
   measuring a strength of the received signal at the mobile device; and
   detecting that the mobile device has moved away from the computer when the measured signal strength is below a threshold.

6. The computer-implemented method of claim 1, wherein detecting the presence of the computer comprises:
   receiving, at the mobile device, a wireless signal from the computer;
   measuring a strength of the received signal at the mobile device; and
   detecting the presence computer when the measured signal strength is equal to or above a threshold.

7. The computer-implemented method of claim 1, wherein the operations further comprise sending user credentials from the mobile device to the computer upon detecting the presence of the computer.

8. The computer-implemented method of claim 1, wherein the operations further comprise:
   after detecting the presence of the computer, periodically turning on a receiver at the mobile device to listen for a signal from the computer;
   wherein detecting that the mobile device has moved away comprises detecting that the mobile device has moved away when the receiver receives a signal from the computer after being turned on and the received signal has a signal strength below a threshold.

9. The computer-implemented method of claim 8, wherein the receiver is periodically turned on based on a clock at the mobile device synchronized with a system time, the system time comprising one of a global positioning system (GPS) time and a cellular network time.

10. The computer-implemented method of claim 1, wherein disabling the lockout mode further comprises disabling the lockout mode upon receiving a message from the computer indicating that the user has been successfully logged into the computer.

11. A system for providing secure access to a mobile device, the system comprising:
   one or more processors; and
   a machine-readable medium comprising instructions stored therein, which when executed by the one or more processors, cause the one or more processors to perform operations comprising:
   receiving a wireless signal from a computer at the mobile device, wherein the wireless signal indicates the presence of the computer;
   disabling a lockout mode of the mobile device upon receiving the wireless signal from the computer, wherein the lockout mode locks the mobile device when no user activity is detected on the mobile device for a period of time,
   wherein the lockout mode is re-enabled at the mobile device when a user of the mobile device is determined to be away from the mobile device even when the mobile device is in the presence of the computer that causes the disabling of the lockout mode;
   detecting when the mobile device has moved away from the computer; and
   enabling the lockout mode of the mobile device upon detecting that the mobile device has moved away from the computer.

12. The system of claim 11, wherein detecting when the mobile device has moved away from the computer comprises detecting when the mobile device losses communication with the computer over a wireless link.

13. The system of claim 12, wherein the wireless link comprises a Bluetooth link or a near field communication (NFC) link.

14. The system of claim 11, wherein detecting when the mobile device has moved away from the computer comprises:
   measuring a strength of the received wireless signal at the mobile device; and detecting that the mobile device has moved away from the computer when the measured strength is below a threshold.

15. The system of claim 11, wherein the received wireless signal indicates the presence of the computer when a measured strength of the received wireless signal is equal to or above a threshold.

16. The system of claim 11, wherein the operations further comprise sending user credentials from the mobile device to the computer upon detecting the presence of the computer.

17. The system of claim 11, wherein disabling the lockout mode further comprises disabling the lockout mode upon receiving a message from the computer indicating that the user has been successfully logged into the computer.

18. A non-transitory machine-readable medium comprising instructions stored therein, which when executed by a processor, cause the processor to perform operations comprising:
   receiving a message from a computer indicating that a user has been successfully logged into the computer;
   disabling a lockout mode of the mobile device upon receiving the message, wherein the lockout mode locks the mobile device when no user activity is detected on the mobile device for a period of time,
   wherein the lockout mode is re-enabled at the mobile device when a user of the mobile device is determined to be away from the mobile device even when the mobile device is in presence of the computer that causes the disabling of the lockout mode;
   detecting when the mobile device has moved away from the computer; and
   enabling the lockout mode of the mobile device upon detecting that the mobile device has moved away from the computer.

19. The non-transitory machine-readable medium of claim 18, wherein the operations further comprise:
   detecting a presence of the computer at the mobile device; and
   sending, from the mobile device to the computer, user credentials for logging the user into the computer upon detecting the presence of the computer.

20. The non-transitory machine-readable medium of claim 18, wherein detecting the presence of the computer comprises receiving a wireless signal from the computer at the mobile device.

* * * * *